(12) United States Patent
Oba et al.

(10) Patent No.: US 8,190,768 B2
(45) Date of Patent: May 29, 2012

(54) NETWORK SELECTION MECHANISM

(75) Inventors: Yoshihiro Oba, Englewood Cliffs, NJ (US); Yuu-Heng Alice Cheng, Piscataway, NJ (US); Ashutosh Dutta, Bridgewater, NJ (US); Miriam Tauil, Berkeley Heights, NJ (US); David Famolari, Stewartsville, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 134 days.

(21) Appl. No.: 12/262,911

(22) Filed: Oct. 31, 2008

(65) Prior Publication Data

US 2010/0115083 A1    May 6, 2010

(51) Int. Cl.
*G06F 15/16* (2006.01)
(52) U.S. Cl. ......... 709/238; 709/239; 709/240; 709/242
(58) Field of Classification Search .................. 709/238, 709/212, 239, 240, 242, 245
See application file for complete search history.

(56) References Cited

U.S. PATENT DOCUMENTS

| | | | | |
|---|---|---|---|---|
| 7,391,732 B1 * | 6/2008 | Cortez et al. | .................. | 370/238 |
| 2004/0047294 A1 * | 3/2004 | Ain et al. | ........................ | 370/238 |
| 2004/0136324 A1 * | 7/2004 | Steinberg et al. | ............. | 370/238 |
| 2005/0148332 A1 | 7/2005 | Buckley et al. | | |
| 2005/0239497 A1 | 10/2005 | Bahl et al. | | |
| 2007/0211638 A1 * | 9/2007 | Lee et al. | ....................... | 370/238 |
| 2008/0062934 A1 | 3/2008 | Zhao | | |
| 2009/0327444 A1 * | 12/2009 | Archer et al. | ................. | 709/212 |
| 2010/0082840 A1 * | 4/2010 | Beeston et al. | ............... | 709/238 |

OTHER PUBLICATIONS

S. Devi et al., "Dynamic Interface Selection in Portable Multi-interface Terminals," 1-4244-1039-8/07, 2007 IEEE, pp. 1-5, Aug. 2007.
I. Joe, et al. "A Network Selection Algorithm considering Power Consumption in Hybrid Wireless Networks," 1-4244-1251-X/07, 2007 IEEE, pp. 1240-1243.
J. Ylitalo, et al., "Dynamic Network Interface Selection in Multihomed Mobile Hosts," Proceedings 36th Hawaii Intl Conf. on Systems Sciences, 0-7695-1874-5/03, 2002 IEEE.
International Search Report of PCT/US09/62798, dated of mailing Dec. 23, 2009.

* cited by examiner

*Primary Examiner* — Djenane Bayard
(74) *Attorney, Agent, or Firm* — Westerman, Hattori, Daniels & Adrian, LLP

(57) ABSTRACT

A terminal device includes multiple interfaces having links to various networks. When a trigger event occurs, the terminal device selects a target link to a network to transition from its current link. A candidate link selection function determines candidate links that are filtered to remove links not meeting connectivity criteria. A target link selection function is then executed to select a target link from the filtered candidate links. Thus, the target link selection function is not run for every possible link, but only those meeting the criteria.

28 Claims, 3 Drawing Sheets

NETWORK SELECTION MECHANISM

FIELD OF THE INVENTION

The present invention relates to the selection of a network by a wireless device. More particularly, the present invention relates to an improved network selection method within a terminal device from multiple networks incorporating multiple interfaces.

DISCUSSION OF THE RELATED ART

Portable devices, such as laptops, phones, personal digital assistants, and the like, include more than one network interface to connect with a variety of wireless technologies. The network access technologies differ depending on which interface is used, and not every wireless connection is the same. Depending on the type of connection and interface used, the different access technologies may involve varying communication requirements, bandwidth, data rates, power requirements and the like. Thus, a portable, or mobile, device needs to select the best network access technology from the variety available based on certain criteria.

Portable or mobile, hereinafter called "terminal," devices usually are embedded with the multiple interfaces that allow access to the wireless networks. A number of network selection schemes may be used to select a wireless network to access from the terminal device. Existing network selection schemes focus on identifying a set of network selection parameters to establish a set of network selection policies and design network selection algorithms.

A terminal device may use the policies and algorithms to select a target network. Once a target network is selected, the terminal device can switch to the target network. These schemes, however, cannot guarantee that the target network provides Internet connectivity. The schemes also cannot determine that the actual performance of the target network in terms of delay, throughput and packet loss is good enough for proper functioning of the terminal device.

These shortfalls may introduce the following problems. After switching to a target network, the terminal device may not have Internet connectivity on the target network due to various operational errors, such as depletion of the address pool maintained by the dynamic host configuration protocol (DHCP), temporal domain name system (DNS) issues, temporal access router problems, temporal firewall and network address translator problems, and the like. Moreover, after switching to the target network, the terminal device may have Internet connectivity on the target link, but the actual performance may not satisfy the quality of service (QoS) requirements for network applications running over the target network. Performance problems include delay, throughput and packet loss.

Thus, schemes are available to help with network selection, but the target network selected may suffer from the above-discussed shortcomings. An inadequate network link causes loss of service and customer satisfaction.

SUMMARY OF THE INVENTION

The disclosed embodiments of the present invention, therefore, seek to provide a network selection method and mechanism that guarantees Internet connectivity and actual performance over a candidate network prior to completion of the actual network selection. The disclosed embodiments incorporate a novel new link selection mechanism that includes a procedure to validate higher layer of candidate links within the procedure of candidate link selection on order to validate Internet connectivity and higher layer performance on candidate links.

Separation of the candidate link selection and the target link selection reduces computation time of the target link selection algorithm by filtering the candidate link selection links that may not be chosen as a target link prior to target link selection. In other words, the number of target links used in the target link selection is reduced so that this process does not waste time on non-desirable links. The disclosed embodiments also define a target link selection algorithm and a number of link selection policies that support the disclosed link selection mechanism.

Thus, the disclosed embodiments recite a method for selecting a target link from a terminal device to a network. The method includes performing a candidate link selection on a plurality of links accessible by the terminal device to determine a plurality of candidate links. The method also includes performing a target link selection on the filtered candidate links to select the target link.

According to the disclosed embodiments, a method for selecting a target link for a terminal device for network connectivity. The method includes executing a candidate link selection function on a plurality of links available to the terminal device via one or more interfaces. The method also includes determining a plurality of candidate links according to the candidate link selection function using a state of the one or more interfaces, or a state of the plurality of links. The method also includes filtering the plurality of candidate links to remove any link that does not meet connectivity criteria of the one or more interfaces. The method also includes executing a target link selection function on the plurality of candidate links to select a target link that meets the connectivity criteria.

Further according to the disclosed embodiments, a terminal device is disclosed. The terminal device includes a plurality of interfaces having links to networks. Each of the plurality of interfaces has a state and each of the links has a state. The terminal device also includes a candidate link selection function to filter the links according to a link selection policy. The terminal device also includes a target link selection function to select a target link from the filtered links, wherein the target link provides Internet connectivity.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed in the claims.

DETAILED DESCRIPTION OF THE PREFERRED EMBODIMENTS

Reference will now be made in detail to the preferred embodiments of the present invention. Examples of the preferred embodiments are illustrated in the accompanying drawings.

Figure 1:
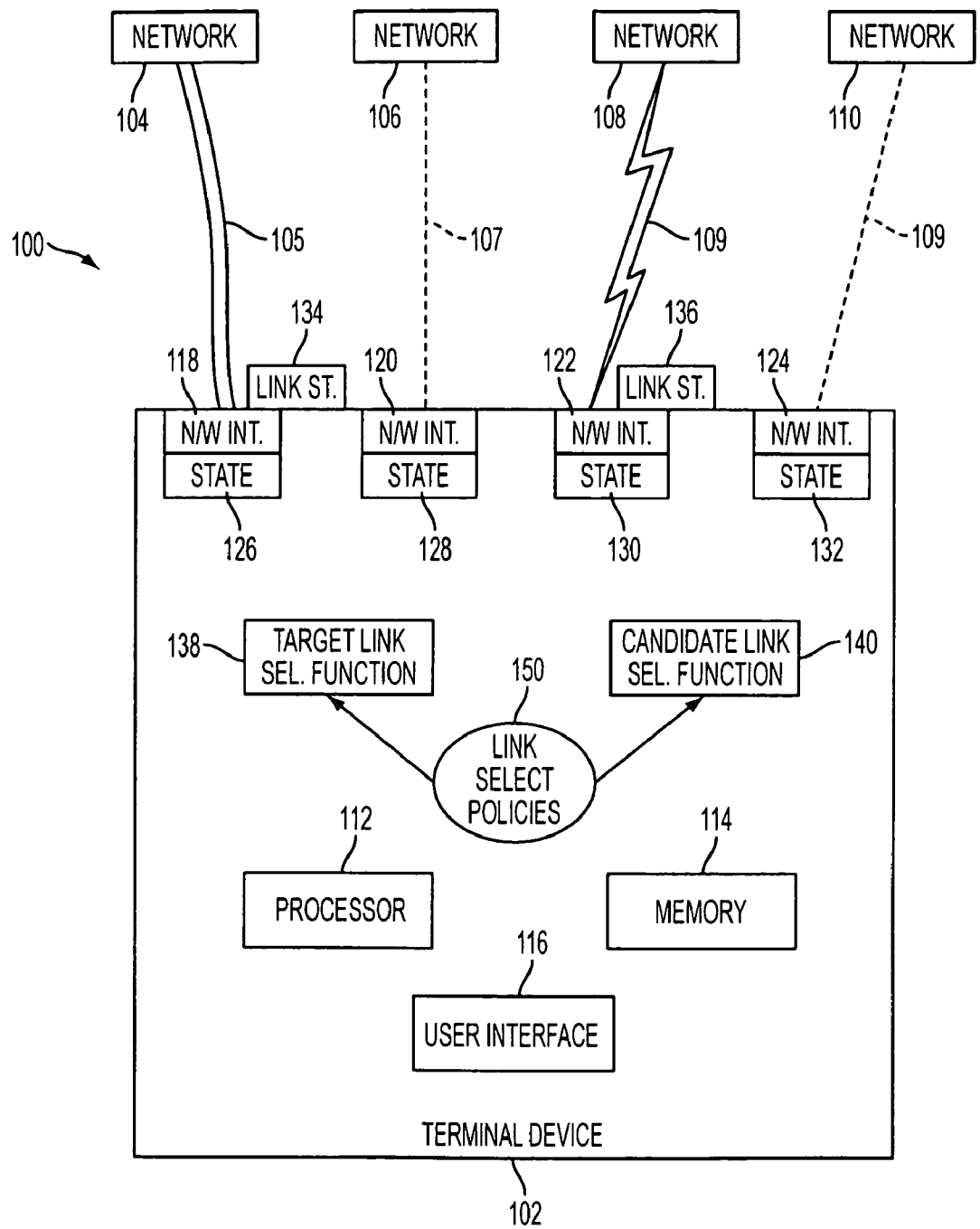
FIG. 1 illustrates a terminal device having multiple interfaces to multiple networks according to the disclosed embodiments.

FIG. 1 depicts a terminal device 102 for use with networks according to the disclosed embodiments. Terminal device 102 may be a mobile or portable device having wireless and wired communications capability within environment 100. As shown in FIG. 1, terminal device 102 may connect to networks 104, 106, 108 and 110. Other networks may exist in environment 100 and also available to connect with terminal device 102.

Terminal device 102 includes various components and functions. For example, terminal device 102 includes a processor 112 and a memory 114. Processor 112 may executes commands stored or written into various functions, programs and algorithms stored on terminal device 102. Memory 114 may store these components along with values, parameters, default settings and the like. User interface 116 may interact with these components and allow a user to input instructions to terminal device 102. User interface 116 also may provide information to the user via a display, audio or visual means and the like.

Terminal device 102 also includes network interfaces 118, 120, 122 and 124. A network interface acts as an entry point to a network of particular link layer type. The link layer technology of a network interface may support multiple link layer or physical layer protocols or mechanisms. Terminal device 102 includes multiple interfaces. Preferably, network interfaces 118, 120, 122 and 124 serve as entry points for a higher layer, such as an Internet protocol (IP) layer or above.

The network interfaces may be connected to wired or wireless networks. For example, network interface 118 may be a wired network interface that uses wired media to receive and send information and data. Network interface 118 may be coupled to wired network 104 by cable 105. Alternatively, terminal device 102 may connect to wireless networks, such as network 108.

Network 108 may use a wireless media to exchange information and data with terminal device 102 via wireless network interface 122. Network interface 122 may connect to wireless network 108 via link 109. Thus, wired network interface 118 and wireless network interface 122 may differ in their procedures, protocols and the like.

A network interface state may be associated with each network interface. In FIG. 1, network interface state 126 pertains to network interface 118, network interface state 128 pertains to network interface 120, network interface state 130 pertains to network interface 122, and network interface state 132 pertains to network interface 124. A network interface state includes a value to indicate what "state" the associated interface is in. For example, the values for the network interface states may include disabled, disconnected, limited connectivity, local connectivity, Internet connectivity, and the like. For wired interfaces, the "Disconnected" state may also be referred to as "Network cable unplugged" state. These values, and others, may be indicated as attributes, disclosed in greater detail below.

A link layer connection exists between terminal device 102 and a network point of attachment. A link may be associated with only one network interface, such as link 109 with network interface 122. Alternatively, a link may be associated with multiple interfaces. One or more links may be present on a network interface when the network interface's state is something other than "disabled."

A link may not have a known link layer address of its network point of attachment, such as a bridge, a hub or the like. For example, link 109 may be associated with network point of attachment in network 108, whose link layer address is not known to terminal device 102.

Links, such as cable 105 and link 109, may have a state associated with it. For example, the link through cable 105 from network interface 118 may have link state 134 associated with it. Link 109 may have link state 136 associated with it. A link state may include one of the following values for that link: disconnected, limited connectivity, local connectivity, Internet connectivity and the like. These values, and others, may be indicated as link state attributes, disclosed in greater detail below.

A serving link may indicate a link for which application packets are transmitted and received. Multiple serving links may exist on terminal device 102. According to FIG. 1, link 109 may indicate the serving link for terminal device 102. Other links include candidate links 107 and 109. A candidate link refers to a link that is eligible for being a target link. A target link is a link that has been selected to be a serving link. For example, candidate link 107 may also become target link 107 if it is selected by a target link selection algorithm used by target link selection function 138.

The act to select one or more target links may be referred to as link selection or network selection. The target link selection algorithm refers to an algorithm used by a target link selection function 138 to select one or more target links during network selection. Thus, of candidate links 107 and 109, one or more links are chosen by candidate link selection mechanism 140 to be a target link. For example, candidate link selection function 140 may select links 107 and 109 as candidates, or may only select link 107. Target link selection function 138 and candidate link selection function 140 may utilize the attributes associated with the network interface states and link states, disclosed above.

As noted above, link state 136 indicates the state of link 109. If link state 136 is "disconnected," then link 109 has no established link layer association with a network point of attachment. If link state 136 is something other than "disconnected," then link 109 has link layer association with a network point of attachment within network 108. Referring to network interface 118, if cable 105 becomes unplugged, then link state 134 would indicate "disconnected."

If link state 136 is "disconnected," then network interface 122 has no link 109 whose state is other than disconnected or link 109 is not established. If link state 136 is "limited connectivity," then link 109 is established on network interface 122 without any non-link local address being assigned. If link state 136 is "local connectivity," then link 109 is established on network interface 122 with a non-link local address being assigned but without connectivity to the Internet. If link state 136 is "Internet connectivity," then terminal device 102 can access typical Internet application servers such as web servers and typical application servers such as email servers and the like, over network interface 122.

Link state 136 may indicate "Internet connectivity with good performance" as its link state. This link state indicates that terminal device 102 can access typical Internet application servers such as typical web servers, email servers and the like. Further, the performance of the typical Internet applications is good enough over network interface 122 and link 109. It is this state that terminal device 102 seeks for its selected network links. Link and interface states also may be used for determining which links are valid and available for target link selection.

Figure 2:
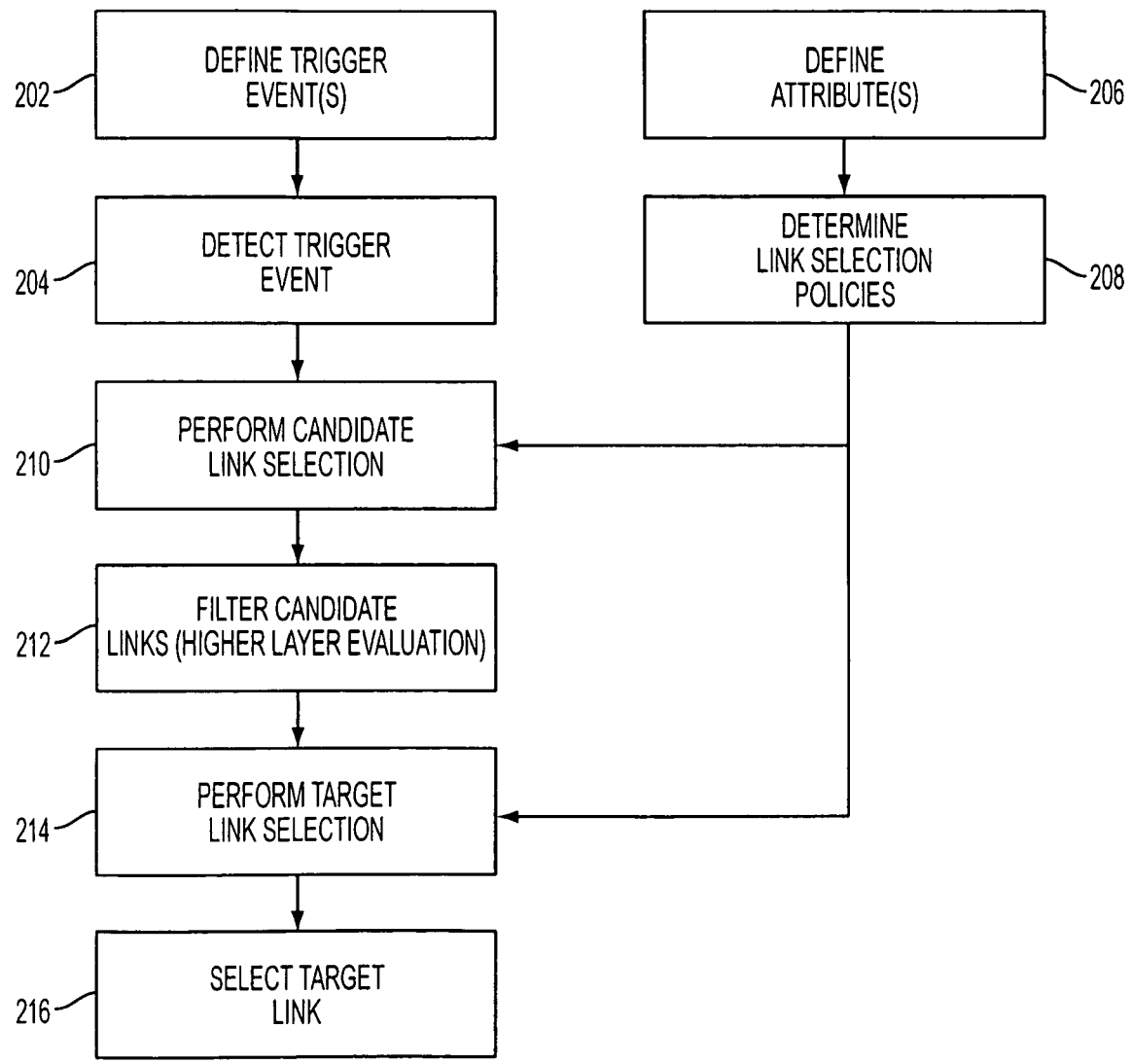
FIG. 2 illustrates a flowchart for selecting a target link according to the disclosed embodiments.

FIG. 2 depicts a flowchart for selecting a target link according to the disclosed embodiments. Step 202 executes by defining a trigger event or events that will trigger target link selection. Target link selection can be triggered when an interface state or a link state changes. An interface state, such as network interface state 130, can change when network interface 122 is enabled or disabled, or when the IP address of network interface 122 changes. A link state, such as link state 136, can change when link 109 is connected or disconnected, link 109 is newly created, link 109 is removed, or when the signal strength of link 109 changes.

Inter-dependency may exist between the link state and the network interface state. For example, if an interface is disabled, all links associated with the interface will be removed. Another example is when the connected link for an interface is changed from one link to another. This may cause an "IP address change" event for the interface.

If a link event will eventually generate an interface event, target link selection may be triggered by the interface event. Similarly, if an interface event will eventually generate a link event, target link selection may be triggered by the link event. If an interface or link event does not generate any other events, link selection may be triggered by the event. Other events that are not link or interface events also may trigger target link selection, such as events generated by users or applications, as defined by or within terminal device 102.

Thus, events may be defined that trigger target link selection. This step, and other examples associated with this step, is disclosed in greater detail below.

Step 204 executes by detecting a trigger event, as defined above. The trigger event indicates that a new link is to be targeted to move to once the existing link is no longer available or is disconnected. Before going onto the candidate link selection and target link selection steps, steps 206 and 208 are disclosed. These steps may be executed independently of the trigger event steps.

Step 206 executes by defining the attributes that will be used by the selection steps in evaluating candidate and target links. The following attributes are provided as examples of the features of terminal device 102 that may be used in selecting a target link. Other attributes also may be used, and the disclosed embodiments are not limited to the attributes disclosed below.

The candidate and target link selection attributes are disclosed in the following format. The "type definition" field represents the type of attribute. The "configured by" field represents the terms USER, SYSTEM, or USER-SYSTEM to indicate that the attribute is configured by the user, by the system or by both. The "depends on" field is an optional field that represents other target link selection attributes on which this attribute depends. Not every attribute includes a "depends on" field. The "description" field includes a detailed explanation of the attribute.

Network Interface Attributes
Network Interface Preference
Type definition: NetworkInterfacePreference ::=INTEGER (1 . . . 255)
Configured by: USER-SYSTEM.
Description: This attribute represents the preference of the network interface. When the preference is not configured by the user, a default value is configured by the system.
Network Interface Type
Type definition: NetworkInterfaceType ::=ENUMERATED {wifi, evdo, ethernet, wimax}
Configured by: SYSTEM
Description: This attribute represents the media type of the network interface.
Network Interface State
Type definition: NetworkInterfaceState ::=ENUMERATED {disabled(0), disconnected(1), limitedConnectivity(2), localConnectivity(3), internetConnectivity(4)}
Configured by: SYSTEM
Depends on: Link State, L3 and higher layer connectivity attributes, and L3 and higher layer performance attributes.
Description: This attribute represents the network interface state.
Network Interface Maximum Throughput
Type definition: NetworkInterfaceMaximumThroughput ::= INTEGER
Configured by: SYSTEM
Description: This attribute represents the maximum throughput of the network interface.
Network Interface Battery Consumption
Type definition: NetworkInterfaceBatteryConsumption ::= ENUMERATED {high, medium, low}
Configured by: SYSTEM
Description: This attribute represents the degree of battery consumption of the network interface.
Network Interface Security Mechanisms
Type definition: NetworkInterfaceSecurityMechanism ::= SEQUENCE OF SecurityMechanism
SecurityMechanism ::=ENUMERATED {null, wep, wpa, wpa2, pkm, pkmv2}
Configured by: SYSTEM
Description: This attribute represents a list of available security mechanisms. Security mechanisms wep, wpa, wpa2 are valid for wireless LAN interfaces only. Security mechanisms for pkm and pkmv2 are valid for WiMAX interfaces only.
Link Attributes
Link State
Type definition: LinkState ::=ENUMERATED {disconnected(2), limitedConnectivity(3), localConnectivity(4), internetConnectivity(5)}
Configured by: SYSTEM
Depends on: Network Interface State, L3 and higher layer connectivity attributes, and L3 and higher layer performance attributes.
Description: This attribute represents the link state.
Link Network Identifier
Type definition: LinkNetworkIdentifier ::=OCTET STRING
Configured by: SYSTEM
Description: This attribute represents the identifier of the network to which the link is connected.
Link Signal Strength
Type definition LinkSignalStrength ::=SEQUENCE {{
type ENUMERATED {absolute, relative},
value INTEGER}
Configured by: SYSTEM
Description: This attribute represents the signal strength in dBm unit or its relative value in an arbitrary percentage scale.
Link Negotiated Speed
Type definition: LinkNegotiatedSpeed ::=INTEGER
Configured by: SYSTEM
Depends on: Link State.
Description: This attribute represents the maximum throughput of the link. This attribute is valid only for a link for which LinkState value is other than disconnected.
Link Negotiated Security Mechanism
Type definition: LinkNegotiatedSecurityMechanism ::=
SecurityMechanism
Configured by: SYSTEM
Depends on: Link State.
Description: This attribute represents the negotiated security mechanism for the link. Security mechanisms wep, wpa, wpa2 are valid for wireless LAN interfaces only. Security mechanisms for pkm and pkmv2 are valid for WiMAX interfaces only. This attribute is valid only for a link for which LinkState value is other than disconnected.

Link Frame Loss Rate

Type definition: LinkFrameLossRate ::=INTEGER

Configured by: SYSTEM

Depends on: Link State.

Description: This attribute represents the measured frame loss rate for a link. The loss rate is equal to the integer part of the result of multiplying 100 times the log 10 of the ratio between the number of frames lost and the total number of frames transmitted in the class population of interest. This attribute is valid only for a link for which LinkState value is other than disconnected (0).

Access Router Availability

Type definition: AccessRouterAvailability ::=TruthValue

Configured by: SYSTEM

Depends on: Interface State.

Description: This attribute represents whether an IP address of an access router is configured and reachable from the interface. A value of true (1) indicates that an IP address of an access router is configured and reachable from the interface. A value of false (0) indicates that an IP address of an access router is not configured or reachable from the interface. This attribute is valid only for an interface for which NetworkInterfaceState value is greater than limitedConnectivity(3).

DNS Availability

Type definition: DnsAvailability ::=TruthValue

Configured by: SYSTEM

Depends on: Interface State.

Description: This attribute represents whether DNS is available from the interface. A value of true (1) indicates that DNS is available. A value of false (0) indicates that DNS is not available. This attribute is valid only for an interface for which NetworkInterfaceState value is greater than limitedConnectivity(3).

ICMP Availability

Type definition: IcmpAvailability ::=TruthValue

Configured by: SYSTEM

Depends on: Interface State.

Description: This attribute represents whether Ping (ICMP echo and echo reply message exchange) to a particular node is available on the interface. A value of true (1) indicates that Ping is available. A value of false (0) indicates that Ping is not available. This attribute is valid only for an interface for which NetworkInterfaceState value is greater than limitedConnectivity(3).

HTTP Availability

Type definition: HttpAvailability ::=TruthValue

Configured by: SYSTEM

Depends on: Interface State.

Description: This attribute represents whether http to a particular node is available on the interface. A value of true (1) indicates that http is available. A value of false (0) indicates that http is not available. This attribute is valid only for an interface for which NetworkInterfaceState value is greater than limitedConnectivity(3).

FTP Availability

Type definition: FtpAvailability ::=TruthValue

Configured by: SYSTEM

Depends on: Interface State.

Description: This attribute represents whether FTP to a particular node is available on the interface. A value of true (1) indicates that FTP is available. A value of false (0) indicates that FTP is not available. This attribute is valid only for an interface for which NetworkInterfaceState value is greater than limitedConnectivity(3).

Email Availability

```
Type definition: EmailAvailability ::= SEQUENCE {
    emailProtocol ENUMERATION { smtp, pop3, imap }
    isAvailable TruthValue
}
```

Configured by: SYSTEM

Depends on: Interface State.

Description: This attribute represents whether an email protocol to a particular node is available on the interface. An isAvailable value of true (1) indicates that the email protocol specified in emailProtocol is available. An isAvailable value of false (0) indicates that the emailProtocol specified in emailProtocol is not available. This attribute is valid only for an interface for which NetworkInterfaceState value is greater than limitedConnectivity(3).

RTT Performance

```
Type definition: RttPerformance ::= SEQUENCE {
    rttMeasurementMethod ENUMERATED { icmp, http },
    server CHOICE {IpAddress, Ipv6Address},
    roundTripTime INTEGER,
    dateAndTime DateAndTime
}
```

Configured by: USER-SYSTEM.

Description: This attribute represents the performance in terms of RTT in msec measured by using a specific method rttMeasurementMethod. The server contains the IP address the target node for which RTT has been measured. The dateAndTime contains the date and time of the measurement. The measured performance may not be considered as valid if the dateAndTime value associated with one of the measured performance metric values is older than certain date and time.

Throughput Performance

```
Type definition: ThroughputPerformance ::= SEQUENCE {
    throughputMeasurementMethod ENUMERATED {icmp, http-get,
    http-download, pathChirp, iperf, ftp }
    server CHOICE {IpAddress, Ipv6Address}
    throughput INTEGER,
    dateAndTime DateAndTime
}
```

Configured by: USER-SYSTEM.

Description: This attribute represents the performance in terms of throughput in bps (bit per second) using a specific measurement method throughputMeasurementMethod. The server contains an IP address of the node for which throughput has been measured. The dateAndTime contains the date and time of the measurement. The measured performance may not be considered as valid if the dateAndTime value associated with one of the measured performance metric values is older than certain date and time.

Packet Loss Rate Performance

```
Type definition: PackeLossPerformance ::= SEQUENCE {
    packetLossMeasurementMethod ENUMERATED { icmp }
    server CHOICE {IpAddress, Ipv6Address}
```

-continued

```
    packeLossRate INTEGER,
    dateAndTime DateAndTime
}
```

Configured by: USER-SYSTEM.
Description: This attribute represents the performance in terms of packet loss rate using a specific measurement method packetLossMeasurementMethod. The loss rate is equal to the integer part of the result of multiplying 100 times the log 10 of the ratio between the number of packets lost and the total number of packets transmitted in the class population of interest. The server contains an IP address of the node for which packet loss has been measured. The dateAndTime contains the date and time of the measurement. The measured performance may not be considered as valid if the dateAndTime value associated with one of the measured performance metric values is older than certain date and time.

Link Preference
Type definition: LinkPreference ::=INTEGER
Configured by: USER-SYSTEM
Description: This attribute represents the user preference for the link. The system may provide the default value. Link preferences may have higher priorities in the target link selection algorithm than interface preferences.

Thus, the above-disclosed attributes may be defined in step 206. Step 208 executes by determining link selection policies 150, as shown in FIG. 1. Link selection policies 150 determine the behavior of target link selection mechanism 138 and candidate link selection mechanism 140. A number of different behaviors may be realized by applying different policies without changing the target or candidate selection algorithms.

Link selection policies 150 may include the maximum number of target links for terminal device 102. Link selection policies 150 also may include the candidate and target link selection attributes defined in step 206. Link selection policies 150 also may include definitions of the candidate link selection attribute evaluation function and the target link selection attribute evaluation function.

Link selection policies 150 also may include a tie-breaking policy. A tie-breaking policy defines a policy on tie-breaker value assignment. Network interface preferences may be used for computing tie-breaker values. Alternatively, if multiple candidate links are selectable from the same network interface, then use of network interface preference values solely as the tie-breaker values may be insufficient and other values are also needed to compute tie-breaker values.

A tie-breaking policy may be dynamically determined based on information input by the user via user interface 116 or other means, such as GPS location information, IEEE 802.11 SSID or SSIDs discovered in the current location, and the like. For example, the tie-breaker for an Ethernet link may be configured to a smaller value than one for a Wi-Fi link is SSID of the connected Wi-Fi has a specific value while the tie-breaker for the Ethernet link may be configured to a larger value than one for another Wi-Fi link.

Link selection policies 150 may be configurable by a local entity, such as a local user or a local application, or by a remote entity, such as a remove handover controller using any protocol. Link selection policies 150 may be statistically or dynamically configured. Link selection policies 150 also use the attributes defined in step 206, or any other attribute that may be used for the selection algorithms disclosed below. Link selection policies 150 may be used in steps 210 and 214.

Step 210 executes by performing candidate selection on candidate target links. Step 210 provides a higher layer evaluation of candidate target links. The higher layer evaluation of a link, such as link 107, is made to check whether terminal device 102 has Internet connectivity on link 107 that satisfies certain QoS requirements for specific Internet applications. When step 210 executes, the links that successfully pass the higher layer evaluation are selected as candidate links from which a target link will be selected. Candidate link selection function 138 of terminal device 102 may perform this step.

Candidate link selection function 138 may represent several example candidate link selection attribute evaluation functions and tie-breakers. The following parameters may define the evaluation functions. $Perf_1$ may denote the last measured performance metric for a link 1, such link 107 or link 109. $Perf_{threshold}$ may denote a threshold of the performance metric. $Perf_{threshold}$ may be determined by the performance requirements of the applications that are running on terminal device 102.

A performance metric may have a multi-dimensional value. Thus, comparison between two multi-dimensional metrics may be based on a multi-dimensional comparison. For example, a performance metric may be a pair of RTT and throughput values. $Rtt_1$ denotes the last RTT value for $link_1$, such as link 107 or 109. $Rtt_{threshold}$ denotes the threshold of RTT, while $tpt_1$ denotes the last throughput value for link 1. $Tpt_{threshold}$ denotes the threshold of throughput. $S_1$ denotes the link state, preferably using a link state attribute, of link 1. A performance metric value may be associated with the time the metric was measured. A performance metric value may not be considered as valid if the time the metric was measured is older than certain past time from the current time. A value (e.g., a negative value) that is smaller than any valid value may be used to represent an invalid or non-existing performance metric value.

Step 210 may incorporate policies determined in step 208 in performing candidate link selection. The following candidate link selection policies may be defined and used in the selection.

Select Currently Internet Connected Links (CICL)

In this candidate link selection policy, links whose link state is "Internet connectivity" are chosen as candidate links. Before applying this policy, the terminal may enable disabled interfaces and establish a link with a point of attachment.

The candidate link selection attribute evaluation function for CICL is defined as follows:

$E'(a_l)=1$ if $s_l \geq 5$.
$E'(a_l)=0$ Otherwise.

Select Existing Links (EL)

In this candidate link selection policy, all existing links are chosen as candidate links. This policy allows two or more links on the same network interface to be selected as candidate links, expecting that more appropriate links can be selected by the target link selection algorithm than CICL. The candidate link selection attribute evaluation function for EL is defined as follows:

$E'(a_l)=1$ if $l \in L$. $E'(a_l)=0$ Otherwise.

Select "Currently Good Performing" Links (CGPL)

In this candidate link selection, links whose current link state is "Internet connectivity" and its performance is good and valid are chosen as candidate links. Before applying this policy, the terminal may enable disabled interfaces, establish a link with a point of attachment, and perform higher layer evaluation of the link. Use of this policy enables higher layer evaluation of links.

The candidate link selection attribute evaluation function for CGPL is defined as follows:

$E'(a_l)=1$ if $l \in L$ and $s_l=5$ and $Perf_l \geq Perf_{threshold}$.
$E'(a_l)=0$ Otherwise.

In the above equations, $Perf_l$ denotes the last measured performance metric for link 1 and $Perf_{threshold}$ denotes a threshold of performance metric. A performance metric may have a multi-dimensional value and therefore comparison between two multi-dimensional metrics may be based on multi-dimensional comparison. For example, a performance metric may be a pair of RTT and throughput.

Select "Recently Good Performing" Links (RGPL)

In this candidate link selection policy, existing links for which the latest measured performance is or was good and valid are chosen as candidate links. This policy allows two or more links on the same network interface to be selected as the candidate links, by which more appropriate links can be selected by the target link selection algorithm than CGPL.

The candidate link selection attribute evaluation function for RGPL is defined as follows:

$E'(a_l)=1$ if $l \in L$. and $Perf_l \geq Perf_{threshold}$.
$E'(a_l)=0$ Otherwise.

The following algorithm shows an example of a candidate link selection attribute evaluation function, such as candidate link selection function 140, when "currently good performing" (CGP) is used as the selection policy defined in step 208.

$E'(a_l)=1$ if $l \in L$ and $s_l=5$ and $Perf_l \geq Perf_{threshold}$.
$E'(a_l)=0$ Otherwise.
$a_l=(s_l, Perf_l)$
$Perf_l=(rtt_l, tpt_l)$
$Perf_l \geq Perf_{threshold}$, if $rtt_l \leq rtt_{threshold} \wedge tpt_l \geq tpt_{threshold}$.
$Perf_l < Perf_{threshold}$, otherwise.
$rtt_l$: The last RTT value for link 1.
$tpt_l$: The last throughput value for link 1.

The following algorithm shows an example of a candidate link selection attribute evaluation function, such as candidate link selection function 140, when "recently good performing" (RGP) is used as the selection policy defined in step 208.

$E'(a_l)=1$ if $l \in L$. and $Perf_l \geq Perf_{threshold}$.
$E'(a_l)=0$ Otherwise.
$a_l=Perf_l$
$Perf_l=(rtt_l, tpt_l)$
$Perf_l \geq Perf_{threshold}$, if $rtt_l \leq rtt_{threshold} \wedge tpt_l \geq tpt_{threshold}$.
$Perf_l \geq Perf_{threshold}$, if $rtt_l \leq 300 \wedge tpt_l \geq 100$.
$Perf_l < Perf_{threshold}$, otherwise.
$rtt_l$: The last RTT value for link 1.
$tpt_l$: The last throughput value for link 1.

Thus, using these examples, step 210 selects one or more good candidate links that may be used for the target link selection function.

Step 212 executes by filtering the candidate links returned in step 210. The disclosed embodiments may filter the candidate links using any value or attribute. For example, step 212 may use one or more of the attributes defined in step 206 to filter out those links that do not meet set criteria or attribute values.

Step 214 executes by performing target link selection. Step 214 may perform the selection using target link selection function 138 of terminal device 102. Target link selection function 138 will evaluate the filtered candidate links having good Internet connectivity for a suitable target link. Target link selection function 138 may incorporate a target link selection algorithm that selects one or more target links. A target link selection algorithm may apply to any link selection policies determined in step 208, as disclosed above. The computational complexity of a target link selection algorithm should not be NP-complete.

An example target link selection algorithm may be defined as the following target link selection procedure. Other target link selection algorithms and their equivalents also may be applicable for this step.

```
/* Select k number of target links from the candidate link evaluation
set X. */
    proc target_link_selection( X,k ) returns T_{k,C}
    {
        if k = 1 then return best_link( X );
        else return kbest_link( X,k );
    }
/* Select the best link from the candidate link evaluation set X. */
proc best_link( X ) returns T_{k,C}
{
    /* This has O(| X |) computational complexity.*/
    m := -∞ ; T_{k,C} := Ø;
    foreach x ∈ X if x_2 > m then {
        T_{k,C} := {x_1} ;
        m := x_2 ;
    }
    return T_{k,C} ;
}
/* Select k number of target link from the candidate link evaluation
set X. */
proc kbest_link( X,k ) returns T_{k,C}
{
    Y: array of x ∈ X ;
    descend_sort( Y,| X |);
    /* descend_sort( ) is any sorting function that has the following
    characteristics.
        - The 1st argument represents the array to be sorted.
        - The 2nd argument represents the size of the array.
        - The 2nd object of in each array element of Y is used as the
    sorting key.
        - Y is sorted in descending order.
    */
    T_{n,C} := Ø ;
    for i := 1 to min(k,| X |) do
    {
        x := Y[i] ;
        T_{k,C} := T_{k,C} ∪ {x_1} ;
    }
    return T_{k,C} ;
}
``` wherein the following terms may be defined for this algorithm as well as the candidate link selection policies, algorithm and attributes and other policies and attributes disclosed above, I: The set of network interfaces supported by the terminal.
L: The set of links present on the terminal.
$L_i$: The set of links present on network interface i.

$$\bigcup_{i \in I} L_i = L.$$

C: A set of candidate links on the terminal. $C \subseteq L$.
$n_l$: The network interface of link 1.
A: The set of target link selection attributes of the terminal.
$a_l$: The target link selection attribute for link 1.

$$\bigcup_{l \in L} \{a_l\} = A.$$

A target link selection attribute can be a multi-tuple object.
A': The set of candidate link selection attributes of the terminal.
$a'_l$: The candidate link selection attribute for link 1.

$$\bigcup_{l \in L} \{a'_l\} = A' \cdot A$$

candidate link selection attribute can be a multi-tuple object.

$b_l$: Tie-breaker value for link l. Each link has a distinct tie-breaker value, i.e., $b_{l_1} \neq b_{l_2} \forall l_1, l_2 \in L$.

B: The set of tie-breaker values for all links. $B \equiv \{b_l | l \in L\}$.

R: The set of real numbers.

max n(S): The n-th maximum value in $\{v \in S | S \subset R\}$.

max(S): The maximum value in $\{v \in S | S \subset R\}$. It is the same as max 1(S).

min(S): The minimum value in $\{v \in S | S \subset R\}$.

$M_n(S)$: The set of $1^{st}$ to n-th maximum values in $S \subset R$, i.e., $M_n(S) \equiv \{\max i(S) | i \in \{1, 2, \ldots n\}\}$.

E'(a): The candidate link selection attribute evaluation function defined for $a \in A'$. It returns a real number. The set of candidate links C is given by $C = \{l | E'(a'_l) > 0, l \in L, a'_l \in A'\}$.

E(a): The target link selection attribute evaluation function defined for $a \in A$. It returns a real number.

F(a,b): The final target link selection attribute evaluation function defined for $a \in A$ and $b \in B$. It returns a real number. F(a,b) has the following characteristics:

$$E(a_1) > E(a_2) \Rightarrow F(a_1, b_1) > F(a_2, b_2).$$

$$E(a_1) = E(a_2) \wedge b_1 > b_2 \Rightarrow F(a_1, b_1) > F(a_2, b_2).$$

$F_l$: The final target link selection attribute evaluation value for link l.

$F_l \equiv F(a_l, b_l)$.

$F_C$: The set of final target link selection attribute evaluation values for all candidate links, i.e., $F_C \equiv \{F_l | l \in C\}$.

X: The candidate link evaluation set that is defined as a set of pairs of a candidate link and its final target link selection attribute evaluation value. $X \equiv \{(l, F_l) | l \in C, F_l \in F_C\}$.

$x_i$: The i-th object in multi-tuple object x.

$T_{k,C}$: The set of target links with the cardinality of min(k,|C|). Specifically, $T_{k,C}$ is the set of links whose final target link selection attribute evaluation value is equal to one of the highest min(k,|C|) ones among the candidate links, i.e., $T_{k,C} \equiv \{l \in C | F_l = m, m \in M_{min(\{k,|C|\})}(F_C)\}$.

Step 216 executes by selecting the target link to switch to using the results of step 214 disclosed above. Tie-breaking policies also may be set up according to the disclosed embodiments. These policies may be defined in the steps set forth above. A discussion, however, is made for these policies. The tie-breaking policies also may be used in association with candidate link selection.

A tie-breaking policy defines a policy on tie-breaker value assignment. Network interface preferences can be used for computing tie-breaker values. On the other hand, if multiple candidate links are selectable from the same network interface, use of network interface preference values solely as the tie-breaker values is insufficient and other values such as SSID preferences are also needed to compute tie-breaker values.

A tie-breaking policy may be dynamically determined based on information input by the user or other means such as GPS location information, IEEE 802.11 SSID or SSIDs discovered in the current location. For example, the tie-breaker for an Ethernet link may be configured to a smaller value than that for a Wi-Fi link if SSID of the connected Wi-Fi has a specific value while the tie-breaker for the Ethernet link may be configured to a larger value than that for another Wi-Fi link.

An example tie-breakers may be defined as follows.

$b_l \equiv pref_l$. $pref_l$: NetworkInterfacePreference for link $l \in L$.

Figure 3:
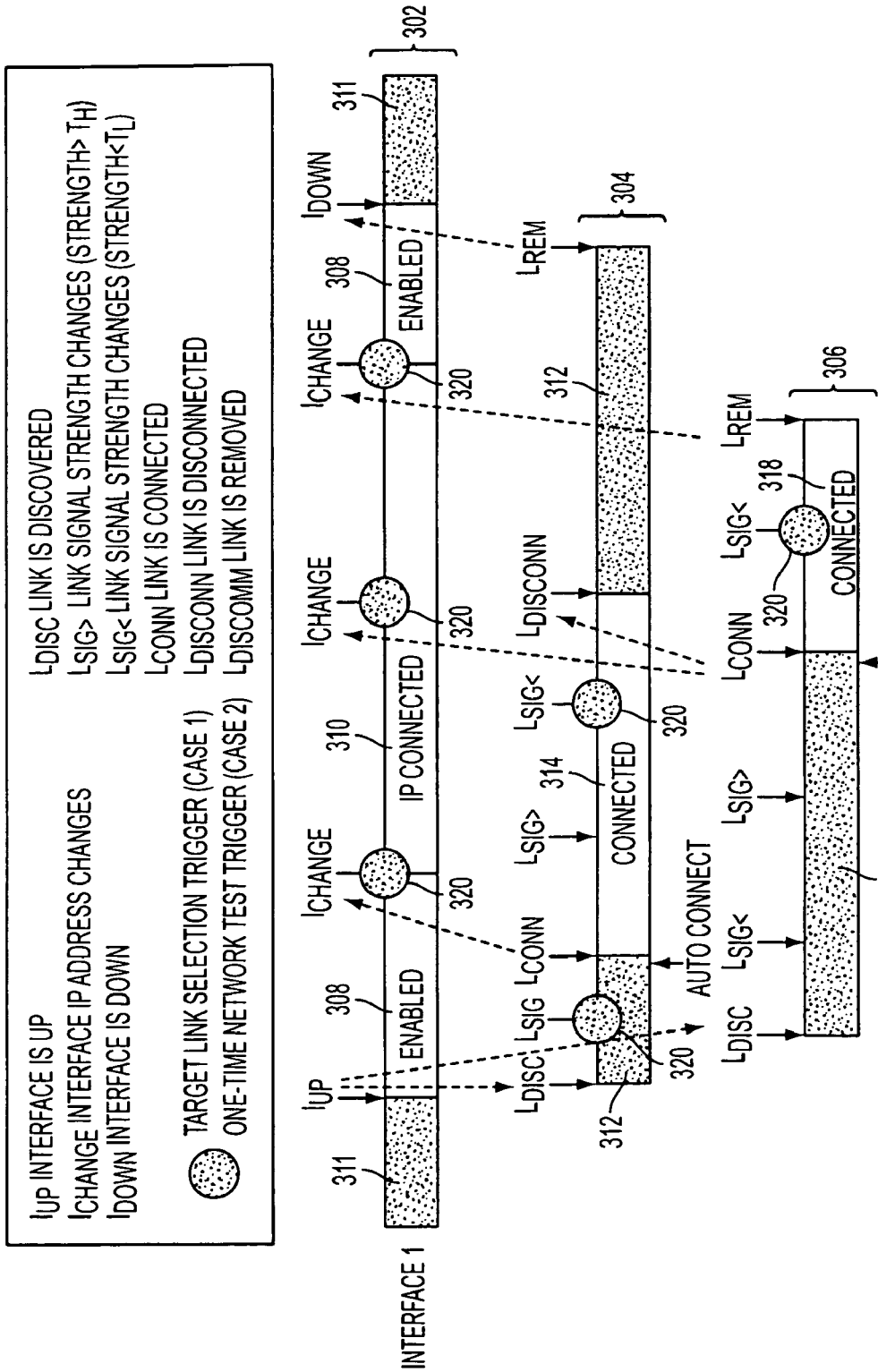
FIG. 3 illustrates a target link selection triggering events based on link and interface events on a two-interface host according to the disclosed embodiments.

FIG. 3 depicts a target link selection triggering events based on link and interface events on a two-interface host according to the disclosed embodiments. Trigger events may be defined in step 202, while detection is executed in step 204. FIG. 3 discloses when target link selection should be made. In FIG. 3, events with circles, shown as trigger events 320, trigger target link selection. Dashed arrows indicate dependency between a link event and an interface event.

In FIG. 3, time bar 302 includes block portions that indicate the status of an interface on terminal device 102. Time bar 304 includes block portions that indicate the status of a first link associated with the interface of time bar 302. Time bar 306 includes block portions that indicate the status of a second link also associated with the interface of time bar 302. Using the time bars, FIG. 3 shows how the interface detects a trigger event 320 and transitions from the first link to the second link.

Enabled blocks 308 of time bar 302 indicate that the interface is enabled. IP connected block 310 indicates that the interface of time bar 302 is connected to the Internet via a network. Disabled blocks 311 indicate when the interface of time bar 302 is disabled and not exchanging data or information with a network.

Time bar 304 represents the status of the first link associated with the interface. The first link may be one that had IP connectivity through it in the past. Connected block 314 indicates the period that the interface is connected to the network using the first link. Disconnected blocks 312 indicate that the first link is disconnected from the network, and the interface of time bar 302 is not IP connected.

Time bar 306 represents the status of the second link associated with the interface, where the second link is targeted by terminal device 102 and the interface of time bar 302 is transitioned to. The second link may be one that did not have IP connectivity through it in the past. Connected block 318 indicates the period that the interface is connected to the network using the second link. Disconnected block 316 indicates that the second link is disconnected from the network.

Target link selection can be triggered when an interface state, or a link state, changes, as shown by trigger events 320. An interface state can change when an interface, such as network interface 122, is enabled or disabled, or when IP address of the interface changes. A link state, such as link state 136, can change when link 109 is connected or disconnected, link 109 is newly created, link 109 is removed, or when the signal strength of the link 109 changes. There is inter-dependency between link state 136 and interface state 130.

Referring back to FIG. 3, $I_{up}$ indicates on time bar 302 when the interface is up. $I_{change}$ indicates when the interface IP address changes as a trigger event 320. $I_{down}$ indicates that the interface is down, and moves into a disabled status. For time bars 304 and 306, $L_{disc}$ indicates when the link associated with the appropriate time bar is discovered. $L_{sig>}$ indicates that the signal strength changes, or strength is equal or greater than a threshold value. $L_{sig<}$ indicates that the signal strength changes, or that the signal strength is less than or, alternatively, equal to, the threshold value.

$L_{conn}$ indicates that the link is connected. $L_{disconn}$ indicates that the link is disconnected. $L_{rem}$ indicates that the link is removed. Further, the first link of time bar 304 shows an auto connect prior to connected block 314, while the second link of time bar 306 shows a manual connect prior to connected block 318. Thus, time bars 302, 304 and 306 show the status of the interface and two associated links, along with events that may trigger the candidate and target link selection functions and processes disclosed above.

Based on the above, FIG. 3 shows the use the following types of link and interface events to trigger target link selection, depending on whether network performance metrics such as RTT, throughput and packet loss rate are used for target link selection. The following cases provide an overview of the triggering event process for terminal device 102.

Case 1: If network performance metrics are not selection criteria, target link selection may be performed upon one of the following events:
- "IP address change" notification for an interface.
- "signal strength change" notification for a candidate link where a link that has or had IP connectivity can be a candidate link.
- "signal strength change" notification for a connected link may not trigger target link selection if the signal strength is above a certain threshold $T_H$.
- "signal strength change" notification for a non-connected link may not trigger target link selection if the signal strength is below a certain threshold $T_L$.
- A local target link selection request event that is generated by a local entity such as a user or an application on the local node.
- A remote target link selection request event is generated by a remote entity such as a remote handover controller and communicated to the local host using any protocol.

Case 2: If network performance metrics are link selection criteria, target link selection may be performed upon one of the following events:
- "Network performance test completion" notification for all candidate links. Network performance test may be performed periodically or based on link-layer events such as "signal strength crossing threshold" event which may be generated when the signal strength of a wireless link crossed up or crossed down a certain threshold and "deviation of beacon reception interval crossing threshold" event in which the standard deviation of measured beacon intervals crossed up or crossed down a certain threshold. Network performance test may be performed based on a local network test request event that is generated by a local entity such as a user or an application on the local node. Network performance test may be performed may be performed based on a remote network test request event that is generated by a remote entity such as a remote handover controller and communicated to the local host using any protocol.
- Any Case 1 event disclosed above.

It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

What is claimed is:

1. A method for selecting at least one target link from a mobile terminal device to a network, the method comprising:
   providing a mobile terminal device having a plurality of heterogeneous interfaces, including at least one wireless interface, a plurality of said plurality of interfaces having a link to a different heterogeneous network;
   said mobile terminal device performing a candidate link selection on a plurality of links accessible by the terminal device to determine a plurality of candidate links; and
   said mobile terminal device performing a target link selection on the filtered candidate links to select the at least one target link and a corresponding one of said heterogeneous interfaces;
   wherein separation of said candidate link selection and said target link selection reduces computation time of said target link selection by filtering candidate link selection links that may not be chosen as a target link prior to said target link selection.

2. The method of claim 1, further comprising detecting a trigger event for selection of the target link.

3. The method of claim 2, wherein the trigger event includes an event generated by a remote node.

4. The method of claim 2, wherein the detecting step includes detecting a change in a state of an interface on the terminal device.

5. The method of claim 2, wherein the detecting step includes detecting a change in a state of a link from the terminal device.

6. The method of claim 1, further comprising filtering the plurality of candidate links according to criteria.

7. The method of claim 6, wherein the filtering step includes removing at least one link from the plurality of candidate links based on the criteria associated with an attribute of a state of an interface or a link of the terminal device.

8. The method of claim 6, wherein the criteria pertains to Internet connectivity of the at least one link.

9. The method of claim 1, further comprising using a tie-breaker procedure to select the target link.

10. The method of claim 6, wherein the criteria pertains to a recently good performing link policy.

11. The method of claim 6, wherein the criteria pertains to a currently good performing link policy.

12. The method of claim 1, wherein the performing the candidate link selection step includes evaluating the plurality of candidate links according to an attribute associated with a state of an interface or a link of the terminal device.

13. The method of claim 1, wherein the performing the candidate link selection step includes evaluating the plurality of candidate links according to a policy defined by the terminal device.

14. The method of claim 1, wherein the target link provides network connectivity corresponding to an application on the terminal device.

15. The method of claim 1, wherein the performing the candidate link selection step includes evaluating the plurality of candidate links according to a policy is defined by a network service provider and communicated to the terminal device.

16. A method for selecting a target link for a mobile terminal device for network connectivity, the method comprising:
   providing a mobile terminal device having a plurality of heterogeneous interfaces, including at least one wireless interface, a plurality of said plurality of interfaces having a link to a different heterogeneous network;
   said mobile terminal device executing a candidate link selection function on a plurality of links available to the terminal device via one or more interfaces;
   said mobile terminal device determining a plurality of candidate links according to the candidate link selection function using a state of the one or more interfaces, or a state of the plurality of links;
   said mobile terminal device filtering the plurality of candidate links to remove any link that does not meet criteria of the one or more interfaces; and
   said mobile terminal device executing a target link selection function on the plurality of candidate links to select a target link that meets the connectivity criteria and a corresponding one of said heterogeneous interfaces;
   wherein separation of said candidate link selection and said target link selection reduces computation time of said target link selection by filtering candidate link selection links that may not be chosen as a target link prior to said target link selection.

17. The method of claim 16, further comprising detecting a trigger event to select the target link for the terminal device.

18. The method of claim 16, further comprising defining an attribute for use by the candidate link selection function.

19. The method of claim 18, wherein the attribute pertains to an interface or a link on the terminal device.

20. The method of claim 16, further comprising defining a policy for use by the candidate selection function.

21. The method of claim 16, wherein the connectivity criteria pertains to connectivity to a network having Internet capability.

22. The method of claim 16, wherein the criteria pertains to a recently good performing link policy.

23. The method of claim 16, wherein the criteria pertains to a currently good performing link policy.

24. The method of claim 16, wherein the criteria pertains to Internet connectivity of the at least one link.

25. A terminal device comprising:
a plurality of heterogeneous interfaces, including at least one wireless interface, a plurality of said plurality of heterogeneous interfaces being configured to have a link to a different heterogeneous network;
a processor configured to perform a candidate link selection function including performing a candidate link selection on a plurality of links accessible by the terminal device to determine a plurality of candidate links; and
said processor configured to perform a target link selection function including performing a target link selection on the filtered candidate links to select at least one target link and a corresponding one of said heterogeneous interfaces;
wherein separation of said candidate link selection and said target link selection reduces computation time of said target link selection by filtering candidate link selection links that may not be chosen as a target link prior to said target link selection.

26. The terminal device of claim 25, wherein the states of the each of the plurality of interfaces and the each of the plurality of links include an attribute used by the candidate link selection function.

27. The terminal device of claim 25, wherein at least one of the plurality of interfaces is a wireless network interface.

28. The method of claim 25, wherein said terminal device is a portable wireless mobile device, said plurality of interfaces include a plurality of wireless interfaces and wherein said candidate link selection function filters links according to a link selection policy, wherein said link selection policy includes link preferences pre-configured by a local user of the wireless mobile device.

* * * * *

UNITED STATES PATENT AND TRADEMARK OFFICE
CERTIFICATE OF CORRECTION

PATENT NO. : 8,190,768 B2  Page 1 of 1
APPLICATION NO. : 12/262911
DATED : May 29, 2012
INVENTOR(S) : Oba et al.

It is certified that error appears in the above-identified patent and that said Letters Patent is hereby corrected as shown below:

In the Specification

In Column 10, Lines 9-10, delete "Candidate link selection function 138" and insert -- Candidate link selection function 140 --, therefor.

In Column 10, Line 11, delete "Candidate link selection function 138" and insert -- Candidate link selection function 140 --, therefor.

In Column 11, Line 29, delete " if $rtt_i \leqq rtt_{threshold} \hat{} tpt_i \geqq tpt_{threshold}$ " and insert -- if $rtt_i \leq rtt_{threshold} \wedge tpt_i \geq tpt_{threshold}$ --, therefor.

In Column 11, Line 41, delete " if $rtt_i \leqq rtt_{threshold} \hat{} tpt_i \geqq tpt_{threshold}$ " and insert -- if $rtt_i \leq rtt_{threshold} \wedge tpt_i \geq tpt_{threshold}$ --, therefor.

In Column 11, Line 42, delete " if $rtt_i \leqq 300 \hat{} tpt_i \geqq 100$ " and insert -- if $rtt_i \leq 300 \wedge tpt_i \geq 100$ --, therefor.

In Column 13, Line 35, delete "min(k,|C|}" and insert -- min(k,|C|) --, therefor.

In the Claims

In Column 18, Line 17, in Claim 28, delete "method" and insert -- terminal device --, therefor.

Signed and Sealed this
Eighteenth Day of November, 2014

Michelle K. Lee
*Deputy Director of the United States Patent and Trademark Office*